United States Patent
Akiyama et al.

(10) Patent No.: US 11,535,237 B2
(45) Date of Patent: Dec. 27, 2022

(54) ELECTRIC DEVICE CONTROL METHOD AND ELECTRIC DEVICE

(71) Applicant: Nissan Motor Co., Ltd., Yokohama (JP)

(72) Inventors: Hidekatsu Akiyama, Kanagawa (JP); Tomoyuki Hanyu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/618,547

(22) PCT Filed: Jun. 14, 2019

(86) PCT No.: PCT/JP2019/023688
§ 371 (c)(1),
(2) Date: Dec. 13, 2021

(87) PCT Pub. No.: WO2020/250428
PCT Pub. Date: Dec. 17, 2020

(65) Prior Publication Data
US 2022/0203960 A1    Jun. 30, 2022

(51) Int. Cl.
*B60W 20/13* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 30/143* (2013.01); *B60W 2510/244* (2013.01)

(58) Field of Classification Search
None
See application file for complete search history.

(56) References Cited

U.S. PATENT DOCUMENTS

| | | | |
|---|---|---|---|
| 6,137,250 A * | 10/2000 | Hirano | B60W 20/00 318/140 |
| 2011/0136620 A1* | 6/2011 | Gibson | B60W 10/06 477/64 |

(Continued)

FOREIGN PATENT DOCUMENTS

| | | |
|---|---|---|
| CN | 104245453 A | 12/2014 |
| CN | 109624962 A | 4/2019 |

(Continued)

*Primary Examiner* — Todd Melton
*Assistant Examiner* — Jason R Roberson
(74) *Attorney, Agent, or Firm* — Global IP Counselors, LLP

(57) ABSTRACT

An electric device control method controls an electric device that includes an internal combustion engine, a first electric motor that receives a driving force of the internal combustion engine to carry out power generation, and a second electric motor connected to a drive shaft. The method sets a rotational speed of the internal combustion engine to increase as a vehicle speed of the vehicle increases while the power generation is carried out by the first electric motor. Where the driving force required by the second electric motor becomes zero or negative while the first electric motor is carrying out power generation by the driving force of the internal combustion engine, the internal combustion engine is stopped where the vehicle speed is greater than or equal to a first threshold value, and the power generation is continued where the vehicle speed is less than the first threshold value.

6 Claims, 4 Drawing Sheets

(51) Int. Cl.
    *B60W 10/08*      (2006.01)
    *B60W 20/40*      (2016.01)
    *B60W 20/15*      (2016.01)
    *B60W 30/14*      (2006.01)

(56) References Cited

U.S. PATENT DOCUMENTS

| | | | |
|---|---|---|---|
| 2012/0172175 A1* | 7/2012 | Nedorezov | B60W 10/06 |
| | | | 477/169 |
| 2015/0106000 A1* | 4/2015 | Romanato | F02N 11/0837 |
| | | | 701/112 |
| 2017/0291606 A1* | 10/2017 | Yamada | F02N 11/0833 |

FOREIGN PATENT DOCUMENTS

| | | |
|---|---|---|
| JP | H06-141406 A | 5/1994 |
| JP | H8-317505 A | 11/1996 |
| JP | 2008-105555 A | 5/2008 |
| JP | 2015-166220 A | 9/2015 |
| JP | 2015-166221 A | 9/2015 |
| JP | 2015-166582 A | 9/2015 |
| JP | 2017-178056 A | 10/2017 |

\* cited by examiner

ELECTRIC DEVICE CONTROL METHOD AND ELECTRIC DEVICE

CROSS-REFERENCE TO RELATED APPLICATIONS

This application is a U.S. national stage application of International Application No. PCT/JP2019/023688, filed on Jun. 14, 2019.

BACKGROUND

Technical Field

The present invention relates to an electric device control method and an electric device.

Background Information

Japanese Laid-Open Patent Application No. 8-317505 (Patent Document 1) discloses a hybrid vehicle that, when the accelerator is off and the remaining battery capacity is less than or equal to a prescribed value, carries out charging by continuing electric power generation by means of the drive torque of the engine.

SUMMARY

However, the example disclosed in Patent Document 1 has the problem that if electric power continues to be generated while the vehicle is coasting, high-speed engine sounds will be heard by an occupant of the vehicle even though the occupant is making a deceleration request, thereby creating discomfort for the occupant.

In view of the problem described above, an object of the present invention is to provide an electric device control method and an electric device that can generate electric power during coasting, while reducing discomfort to the occupants as the vehicle coasts.

In order to solve the problem described above, in an electric device control method and an electric device according to one aspect of the present invention, when the generation of electric power is carried out by a first electric motor by the driving force of an internal combustion engine that is rotatably supported relative to the drive shaft of a vehicle, the rotational speed of the internal combustion engine is set higher as the speed of the vehicle increases, and where the driving force required by a second electric motor that is connected to the drive shaft becomes zero or negative, the internal combustion engine is stopped if the vehicle speed is greater than or equal to a first threshold value; and the power generation is continued if the vehicle speed is less than the first threshold value.

By the present invention, it is possible to generate power during coasting, while reducing discomfort to the occupants during coasting of the vehicle.

BRIEF DESCRIPTION OF THE DRAWINGS

Referring now to the attached drawings which form a part of this original disclosure.

DETAILED DESCRIPTION OF EMBODIMENTS

Figure 1:
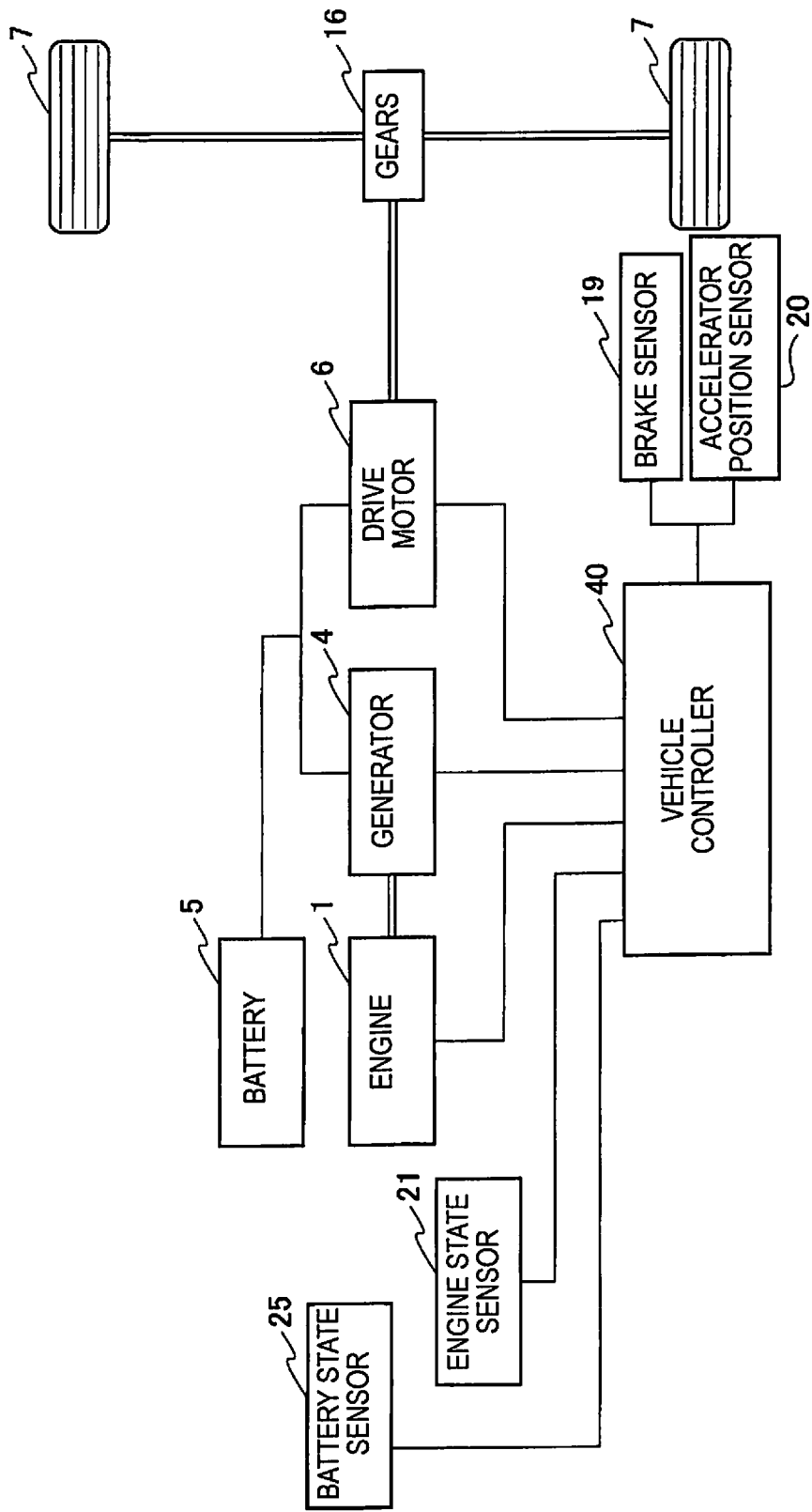
FIG. 1 is a block diagram illustrating the configuration of a hybrid vehicle that includes the electric device according to one embodiment of the present invention.

An embodiment of the present invention will now be described with reference to the drawings. In the description, the same elements have been designated by the same reference numerals, and redundant explanations have been omitted.

Configuration of the Electric Device

The configuration of a hybrid vehicle that includes an electric device according to the present embodiment will be described with reference to FIG. 1. The hybrid vehicle according to the present embodiment comprises an engine 1 (internal combustion engine), a generator 4 (first electric motor), a battery 5 (power storage device), a drive motor 6 (second electric motor), and wheels 7 (drive wheels). The wheels 7 of the hybrid vehicle are not driven by the engine 1, but rather the wheels 7 are driven by the drive motor 6 using electric power from the battery 5, and because the engine 1, the battery 5, the drive motor 6, and the wheels 7 are connected in series (series connection), the hybrid vehicle is called a series hybrid vehicle.

The engine 1 is mechanically connected to the generator 4. The engine 1 is rotatably supported relative to a drive shaft of a vehicle, so the engine 1 does not drive the wheels 7. The generator 4 is connected to the battery 5 so as to be able to send and receive power. The generator 4 and the drive motor 6, as well as the battery 5 and the drive motor 6, are also connected to each other so as to be able to send and receive power. The drive motor 6 is mechanically connected to an axle via gears 16, and the axle is mechanically connected to the wheels 7.

The driving force of the engine 1 is transmitted to the generator 4, and the generator 4 rotates and generates electric power by the driving force of the engine 1. When the electric power generated by the generator 4 flows to the battery 5, the electric power is consumed for charging the battery 5. Moreover, when the electric power generated by the generator 4 flows to the motor 6, the electric power is consumed for driving the motor 6.

Electric power from the generator 4 and/or the battery 5 is supplied to the drive motor 6, which consumes the supplied electrical to produce driving force. The driving force of the drive motor 6 is transmitted to the wheels 7 via the gears 16 and the axle (drive shaft). The wheels 7 are driven to rotate by the driving force from the drive motor 6, thereby powering the series hybrid vehicle (hereinafter, the vehicle).

Further, when torque is input to the drive motor 6 from the wheels 7 via the axle and the gears 16 and the drive motor 6 is rotated by the input torque, e.g., when the vehicle is decelerating or travels downhill, the drive motor 6 operates as a generator and generates regenerative power. When regenerative power is generated in the drive motor 6, regenerative braking force is applied to the wheels 7 via the gears 16 and the axle due to reaction torque that is input to the drive motor 6.

When the regenerative power generated by the drive motor 6 flows to the battery 5, the regenerative power is consumed for charging the battery 5. Further, when the regenerative power generated by the drive motor 6 flows to the generator 4, the regenerative power is consumed for driving the engine 1 and the generator 4 against the resistance (engine brake) of the engine 1.

The battery 5 has the capability of being charged and discharged. When the battery 5 is charged, the battery 5 stores the energy of the electric power supplied from the generator 4 or the drive motor 6. And when the battery 5 is discharged, the battery 5 supplies the stored energy as electric power to the drive motor 6.

The flow of electric power between the generator 4, the battery 5, and the drive motor 6 can change based on the state of the battery 5 and the drive motor 6, on the travel scenario of the vehicle, and on supply and demand conditions for electric power of the entire vehicle, including other auxiliary machines installed in the vehicle (variable cylinder management (VCM) control system of the engine, air conditioner, car stereo, navigation system, etc.). The flow of electric power between the generator 4, the battery 5, and the drive motor 6 is determined by the control of a vehicle controller 40, described further below.

For example, if it is necessary for the drive motor 6 to generate driving force, electric power may be supplied from the battery 5 to the drive motor 6. If sufficient electric power cannot be supplied from the battery 5 to the drive motor 6, the engine 1 may be driven to generate electric power with the generator 4, and the drive motor 6 may be supplied with electric power from the generator 4 as well as from the battery 5.

Further, when the battery 5 is not completely charged, the regenerative power generated by the drive motor 6 when the vehicle decelerates or goes downhill may be supplied from the drive motor 6 to the battery 5. Also, when the battery 5 is not completely charged, the engine 1 may be driven to generate electric power with the generator 4, and the electric power from the generator 4 can be supplied to the battery 5.

Further, when the state of charge (SOC) of the battery 5 is high, the regenerative power generated by the drive motor 6 when the vehicle decelerates or goes downhill may be supplied to the generator 4. In this case, the regenerative power supplied from the drive motor 6 to the generator 4 is consumed by the generator 4 to work against the engine braking by the engine 1, and thus, the regenerative power supplied from the drive motor 6 to the generator 4 is forcibly discharged.

The vehicle further comprises a brake sensor 19 that detects the braking force, an accelerator position sensor 20 (APS) that detects the accelerator opening degree, an engine state sensor 21 that detects the engine state, a battery state sensor 25 that detects the charge state of the battery, and the vehicle controller 40 that controls the entire hybrid car. The vehicle controller 40 functions as a control circuit that controls the electric device according to the present embodiment.

The vehicle controller 40 is electrically connected to the brake sensor 19, the accelerator position sensor 20, the engine state sensor 21, and the battery state sensor 25. The vehicle controller 40 receives signals indicating the brake hydraulic pressure from the brake sensor 19 and signals indicating the accelerator opening degree Ac of the accelerator pedal (input device) from the accelerator position sensor 20.

If the vehicle is an autonomous driving vehicle, the vehicle controller 40 may receive signals indicating the accelerator opening degree Ac from an electronic control unit that is used to control the autonomous driving of the vehicle, instead of from the accelerator position sensor 20.

In addition, the vehicle controller 40 receives signals indicating the state of the engine 1 from the engine state sensor 21. Here, signals indicating the state of the engine 1 include signals indicating whether fuel is being supplied to the engine 1, and signals indicating the engine rotational speed Rc. Further, the vehicle controller 40 receives signals indicating the charge state of the battery from the battery state sensor 25, and acquires vehicle speed V of the vehicle from a vehicle speed sensor, not shown, or the like.

The vehicle controller 40 is electrically connected to the engine 1, the generator 4, and the drive motor 6 via signal lines. The vehicle controller 40 controls the engine 1, the generator 4, and the drive motor 6 in order to generate torque from the drive motor 6 in accordance with the accelerator opening degree Ac.

The vehicle controller 40 controls the driving states of the engine 1, the generator 4, and the drive motor 6, and the states of other auxiliary machines, not shown, are determined, so that the flow of electric power between the generator 4, the battery 5, and the drive motor 6 can be ascertained.

The vehicle controller 40 can be realized by a general-purpose microcomputer equipped with, for example, a CPU (central processing unit), memory, and an input/output unit. A computer program (control program) that programs the microcomputer to serve as the vehicle controller 40 is installed in the microcomputer and executed. The general-purpose microcomputer thereby functions as the vehicle controller 40.

In the present embodiment, an example is shown in which the vehicle controller 40 is realized in software, but the vehicle controller 40 may of course be configured by preparing dedicated hardware for executing each information processing task described below. In addition, a plurality of units (41, 43, 45, 47) included in the vehicle controller 40 may be realized in specific hardware. Moreover, the vehicle controller 40 may also serve as an electronic control unit (ECU) used for other vehicle controls.

Figure 2:
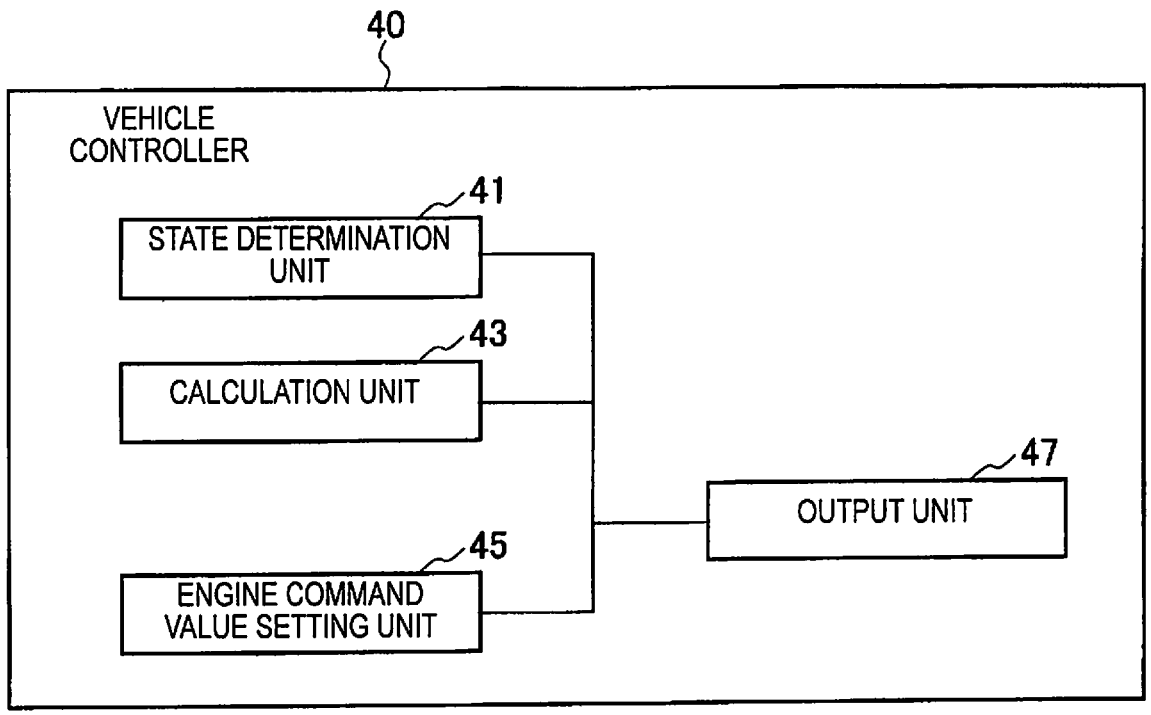
FIG. 2 is a block diagram illustrating the functional constituent elements of a vehicle controller.

The functional constituent elements included in the vehicle controller 40 will now be described with reference to FIG. 2. The functional constituent elements of the vehicle controller 40 include a state determination unit 41, a calculation unit 43, an engine command value setting unit 45, and an output unit 47.

Based on a signal indicating the accelerator opening degree Ac, the state determination unit 41 determines whether the required driving force required from the drive motor 6 has been reduced. More specifically, the state determination unit 41 determines whether the required driving force required from the drive motor 6 is zero or a negative value. Then, when it is determined that the required driving force is zero or a negative value, the engine 1 is controlled based on the vehicle speed V and the charge state of the battery 5.

More specifically, the state determination unit 41 determines whether the vehicle speed V is greater than or equal to a vehicle speed threshold value V1 (first threshold value), or whether the vehicle speed V is less than a vehicle speed threshold value V2 (second threshold value) (where the vehicle speed threshold value V2 is less than the vehicle speed threshold value V1). When it is determined that the vehicle speed V is greater than or equal to the vehicle speed threshold value V1, or that the vehicle speed V is less than the vehicle speed threshold value V2, the state determination unit 41 sends a command value to the output unit 47 to stop the engine 1.

For example, when the rotational speed Rc of the engine 1 is set to be higher in stepwise fashion according to the vehicle speed V, the vehicle speed threshold value V1 is set to a vehicle speed which will elicit a change in the engine rotational speed Rc. That is, the engine rotational speed Rc that is set when the vehicle speed V is greater than or equal to the vehicle speed threshold value V1 is greater than the engine rotational speed Rc that is set when the vehicle speed V is less than the vehicle speed V1, and the engine rotational speed Rc increases in stepwise fashion.

As a result of setting the engine rotational speed Rc higher in stepwise fashion according to the vehicle speed V, it is possible to prevent discomfort caused by a change in engine rotational speed Re in response to minute changes in the vehicle speed V. In addition, as a result of setting the vehicle speed threshold value V1 to a vehicle speed which elicits a change in the engine rotational speed Rc, it is possible more reliably to prevent the noise that is generated by setting the engine 1 to a high engine rotational speed Re from being heard by an occupant.

The vehicle speed threshold value V2 is set in consideration of road noise and the sound generated by the engine 1 when the vehicle speed V is less than the vehicle speed threshold value V2. For example, the vehicle speed threshold value V2 may be set to about 10-15 km/h, but no limitation is imposed thereby. For quieter sounds from engine, the vehicle speed threshold value V2 may be set lower.

When the vehicle speed V is less than vehicle speed threshold value V2, the engine 1 may continue to be rotated at an idling rotational speed at which autonomous combustion is possible. When the net fuel consumption rate (described in detail below) of the engine 1 is taken into consideration, the net fuel consumption rate at the idling rotational speed tends to be higher than the net fuel consumption rate when the engine 1 is rotating under normal operating conditions. However, since the idling rotational speed is a low rotational speed, the sound generated by the engine 1 does not become problematic in comparison with road noise, even in a stopped state or a low-speed travel state in which there is little road noise. Therefore, if the vehicle speed V is less than the vehicle speed threshold value V2, the engine 1 may continue to be rotated at an idling rotational speed at which autonomous combustion is possible.

In addition, when the state determination unit 41 determines that the vehicle speed V is greater than or equal to the vehicle speed threshold value V2 and that the vehicle speed V is less than the vehicle speed threshold value V1, the state determination unit 41 further determines whether the state of charge of the battery 5 is greater than or equal to a prescribed charge quantity threshold value. Then, if it is determined that the state of charge of the battery 5 is greater than or equal to the prescribed charge quantity threshold value, the state determination unit 41 sends a command value to the output unit 47 to stop the engine 1.

On the other hand, if it is determined that the state of charge of the battery 5 is less than the charge quantity threshold value, the state determination unit 41 maintains the rotation of the engine 1 and continues power generation with the generator 4 (that is, carries out "continued power generation with the engine").

It can also be stated in regard to the control based on the charge quantity threshold value that if the state of charge of the battery 5 is less than the charge quantity threshold value, control that prioritizes "continued power generation with the engine" is carried out, and the battery 5 is charged until the state of charge of the battery 5 reaches the prescribed charge quantity threshold value. On the other hand, if the state of charge of the battery 5 is greater than or equal to the prescribed charge quantity threshold value, a control that prioritizes efficiency of the entire system is carried out.

How to carry out a control based on the charge quantity threshold value when the system includes a control for changing the quantity of fuel supplied in accordance with changes in the air density will be described. If the air density is low, when it is attempted to prioritize the operation of the engine 1 with the same efficiency as when the air density is normal, the torque generated by the engine 1 will decrease, so that the electric power generated by the generator 4 also decreases. That is, if the air density is low, there is a trade-off between efficiency and electric power generation.

With respect to the trade-off that exists between efficiency and electric power generation, when the state of charge of the battery 5 is less than the prescribed charge quantity threshold value, control to prioritize "continued power generation with the engine" is carried out in order to prioritize power generation. On the other hand, when the state of charge of the battery 5 is greater than or equal to the prescribed charge quantity threshold value, a control for changing the supplied quantity of fuel in accordance with the change in air density is carried out in order to prioritize efficiency.

If the state of charge of the battery 5 can be increased so as to be greater than the prescribed charge quantity threshold value in the period during travel, between the release of the accelerator pedal and stopping, control can be executed that prioritizes efficiency the next time the vehicle is started.

If it is determined that the state of charge of the battery 5 cannot be increased so as to be greater than the prescribed charge quantity threshold value in the period during travel, between the release of the accelerator pedal and stopping, control can be executed that prioritizes efficiency the next time the vehicle is started by continuing power generation until the charge quantity threshold value is exceeded.

In this manner, the charge quantity threshold value with respect to the state of charge of the battery 5 is set in consideration of whether to prioritize control that prioritizes the efficiency of the entire system or control that prioritizes electric power generation when the vehicle is started.

The calculation unit 43 calculates, based on the vehicle speed V, the quantity of regenerative power assumed to be obtained by the drive motor 6 before the vehicle stops. More specifically, the kinetic energy of the vehicle is calculated based on the vehicle speed V and the weight of vehicle body, and the kinetic energy of the vehicle is multiplied by the regenerative efficiency, thereby calculating the quantity of regenerative power assumed to be obtained through regeneration. In addition, the calculation unit 43 may calculate the potential energy of the vehicle that can be converted into the kinetic energy based on the gradient, etc., of the road on which the vehicle travels, and add the energy obtained by multiplying the calculated potential energy by the regenerative efficiency to the quantity of regenerative power assumed to be obtained through regeneration.

In addition, the calculation unit 43 calculates the required quantity of electric power (prescribed quantity of electric power) that is required to change the state of charge of the battery 5 from the current state to the state of the charge quantity threshold value based on the state of charge of the battery 5. That is, the required quantity of electric power is the difference between the quantity of electric power stored in the battery 5 at the charge quantity threshold value and the quantity of electric power currently stored in the battery 5.

In addition, the calculation unit 43 may then calculate, as the vehicle speed threshold value V1 used for the determination by the state determination unit 41, the vehicle speed required for generating all of the required quantity of electric power by the regenerative power of the drive motor 6.

The required quantity of electric power may be calculated as the quantity of electric power required to change the state of charge of the battery 5 from the current state to a fully-charged state. Here, the fully charged state may be defined as a state in which, for example, the state of charge of the battery 5 is 80-100% in consideration of the performance characteristics related to the charging/discharging of the battery 5. The "80-100%" stated herein is merely an example, and no limitation is imposed thereby.

The engine command value setting unit 45 sets a command value for driving at the engine rotational speed Rc of the engine 1 based on the vehicle speed V and outputs the command value to the output unit 47. Specifically, the command value is set such that the engine rotational speed Rc increases as the vehicle speed V increases. The engine command value setting unit 45 may set the command value such that the engine rotational speed Rc increases continuously as the vehicle speed V increases, or may set the command value such that the engine rotational speed Rc increases in stepwise fashion as the vehicle speed V increases.

Figure 4:
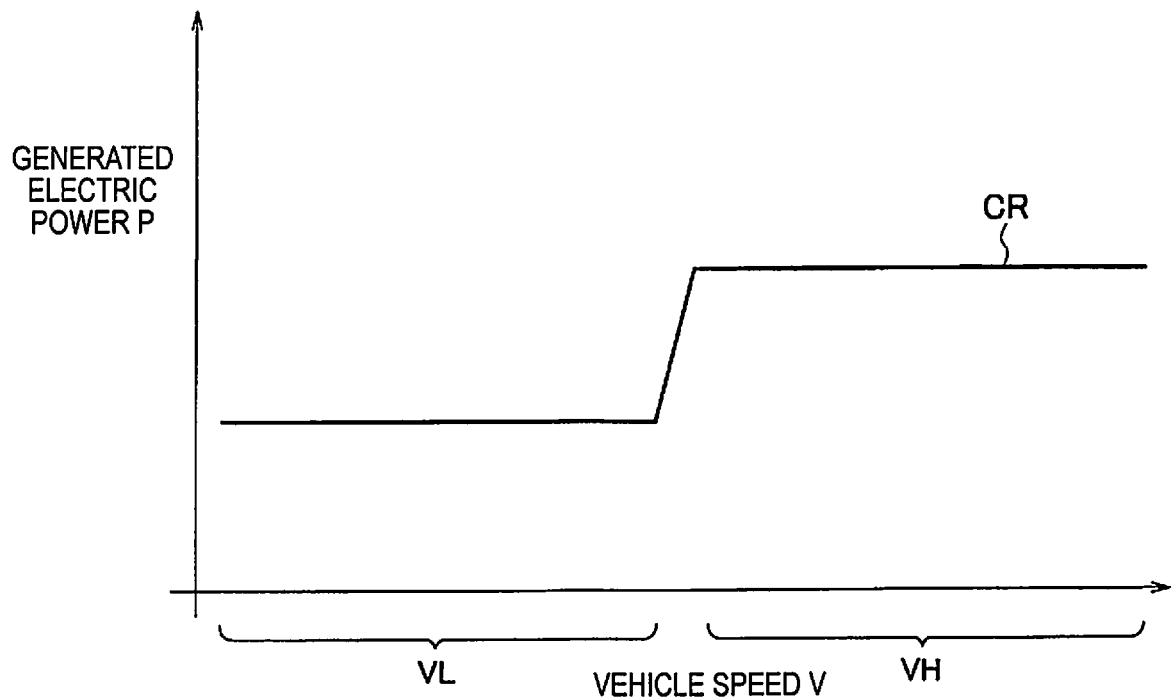
FIG. 4 is a schematic diagram illustrating the state of change of the generated electric power that is changed in accordance with the vehicle speed.
Figure 5:
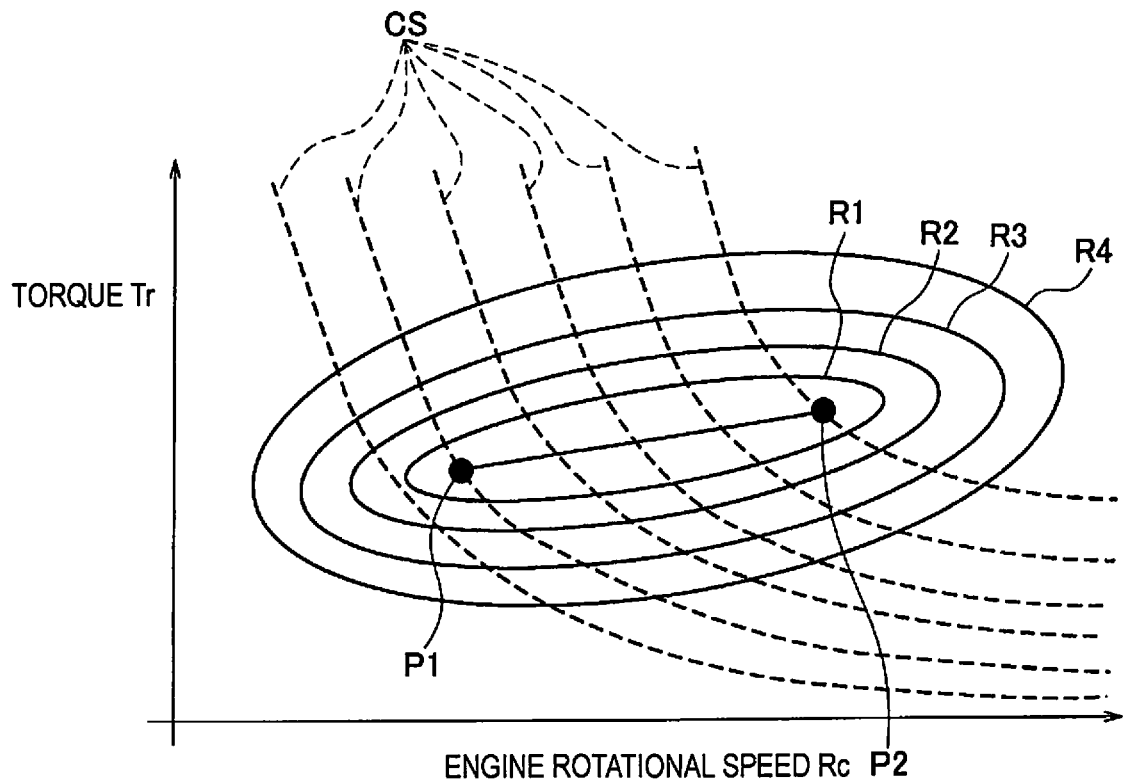
FIG. 5 is a schematic diagram illustrating the operating points and net fuel consumption rate of the engine.

The reason for setting the command value such that the engine rotational speed Rc increases as the vehicle speed V increases will now be described with reference to FIGS. 4 and 5. FIG. 4 is a schematic diagram illustrating the state of change of the generated electric power that is changed in accordance with the vehicle speed of the vehicle. FIG. 5 is a schematic diagram illustrating the operating points and net fuel consumption rate of an engine. The net fuel consumption rate is a value that indicates the weight of fuel consumed by the engine in order to generate a unit amount of work by the engine. A low net fuel consumption rate indicates better fuel economy.

The road noise of a vehicle tends to increase with vehicle speed V. Thus, in situations in which the vehicle speed V is high, the high-speed engine sounds produced by the engine 1 tends to be unnoticeable because of the effect of road noise, even if the engine rotational speed Rc of the engine 1 is high. In addition, as the engine rotational speed Rc increases, the electric power P generated by the generator 4 will also increase, and the battery 5 can be charged in a shorter period of time. Accordingly, the engine command value setting unit 45 sets the command value so as to increase the engine rotational speed Rc as the vehicle speed V increases.

The polygonal line segment CR in FIG. 4 shows that the generated electric power P when the vehicle speed V is in the high-speed region VH is set to be higher than the generated electric power P when the vehicle speed V is in the low-speed region VL. FIG. 4 shows that the generated electric power P increases in stepwise fashion as a result of setting the command value for the engine 1 such that the engine rotational speed Rc increases in stepwise fashion as the vehicle speed V increases.

FIG. 5 shows a map of the net fuel consumption rate on a plane defined by a horizontal axis engine rotational speed Rc and a vertical axis representing torque Tr. The iso-output lines CS indicate lines of constant engine output. In the net fuel consumption rate map, the net fuel consumption rate is smallest in the region enclosed by contour line R1, and increases outwardly moving in the direction of contour line R2, contour line R3, and contour line R4.

In order to efficiently generate power in a system in which the engine 1 and the generator 4 are combined, it is preferable to control the engine 1 to have a combination of the engine rotational speed Rc and the torque Tr, as indicated by the operating points inside the region enclosed by the contour line R1, where the net fuel consumption rate is low. In particular, it is preferable to control the engine 1 such that there is a combination of engine rotational speed Rc and torque Tr indicated by operating points on a curve obtained by connecting the operating points on the iso-output lines CS at which the net fuel consumption rate becomes lowest (for example, the curve inside the contour line R1 that connects the operating point P1 and the operating point P2).

Furthermore, when there are operating points associated with preferable characteristics in terms of the performance of the engine 1, such as reduced noise generated by the engine 1, from among the operating points on the curve obtained by connecting the operating points on the iso-output lines CS at which the net fuel consumption rate is lowest, it is preferable that such operating points be used preferentially, and that the engine 1 be controlled so as to set the engine rotational speed Rc in stepwise fashion.

The output unit 47 outputs a stop engine 1 command value transmitted from the state determination unit 41 to the engine 1, and a command value transmitted from the engine command value setting unit 45 to the engine 1.

Engine Control Processing Procedure

The engine control processing procedure carried out by the electric device according to the present embodiment will now be described with reference to the flowchart of FIG. 3.

Figure 3:
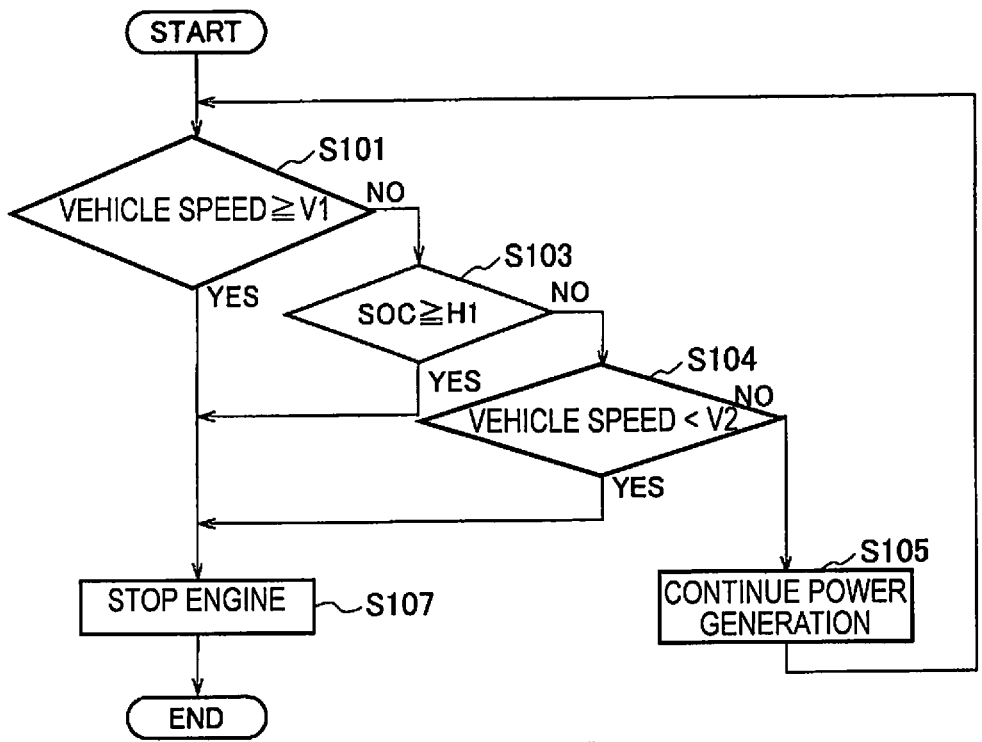
FIG. 3 is a flowchart illustrating the processing flow of engine control carried out by the electric device according to one embodiment of the present invention.

The engine control process shown in FIG. 3 is executed when it is determined that the driving force required by the drive motor 6 is zero or a negative value.

As shown in FIG. 3, first, in Step S101, it is determined whether the vehicle speed V is greater than or equal to the vehicle speed threshold value V1. If it is determined that the vehicle speed V is greater than or equal to the vehicle speed threshold value V1 (YES in Step S101), then the process proceeds to Step S107, and a command value for stopping the engine 1 is output, thereby stopping the engine 1.

If it is determined that the vehicle speed V is less than the vehicle speed threshold value V1 (NO in Step S101), in Step S103, it is determined whether the state of charge of the battery 5 is greater than or equal to a prescribed charge quantity threshold value. If it is determined that the state of charge of the battery 5 is greater than or equal to the prescribed charge quantity threshold value (YES in Step S103), then the process proceeds to Step S107.

On the other hand, if it is determined that the state of charge of the battery 5 less than the prescribed charge quantity threshold value (NO in Step S103), in Step S104, it is determined whether the vehicle speed V is less than the vehicle speed threshold value V2. If it is determined that the vehicle speed V is less than the vehicle speed threshold value V2 (YES in Step S104), then the process proceeds to Step S107.

On the other hand, if it is determined that the vehicle speed V is greater than or equal to the vehicle speed threshold value V2 (NO in Step S104), the process proceeds to Step S105, the rotation of the engine 1 is maintained, and power generation carried out by the generator 4 is continued. The process then returns to Step S101.

First Example of Engine Control

Figure 6:
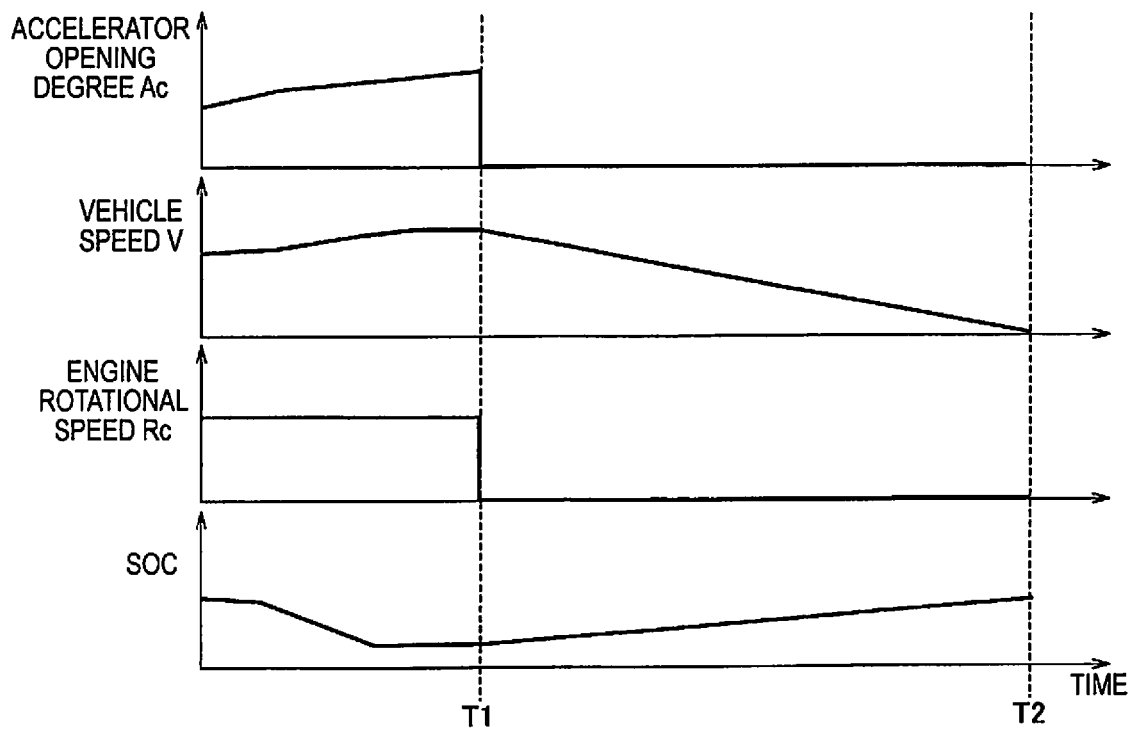
FIG. 6 is a timing chart illustrating a first example of engine control carried out by the electric device according to one embodiment of the present invention.

Next, FIG. 6 is a timing chart illustrating a first example of engine control carried out by the electric device according to the present embodiment. FIG. 6 shows changes in the accelerator opening degree Ac, changes in the vehicle speed V, changes in the engine rotational speed Rc, and changes in the state of charge (SOC) of the battery 5.

In the timing chart shown in FIG. 6, the engine 1 is started and power generation is started in the generator 4, which receives the driving force from the engine 1 at the time period before time T1.

Here, it is assumed that at time T1 the accelerator opening degree Ac becomes zero and that the required driving force required by the drive motor 6 is zero or a negative value. Therefore, in the time period after time T1, the vehicle carries out coasting in which the vehicle speed gradually decreases and the vehicle stops at time T2. This state is shown by changes in the vehicle speed V after time T1.

If the vehicle speed V is greater than or equal to the vehicle speed threshold value V1 or the vehicle speed V is less than the vehicle speed threshold value V2 at time T1, the engine 1 is stopped, so that the engine rotational speed Rc becomes zero after time T1. After time T1, the battery 5 is charged by the regenerative power from the drive motor 6.

If the engine 1 is not stopped after time T1, since the vehicle speed V is greater than or equal to the vehicle speed threshold value V1 at time T1, the engine rotational speed Rc of the engine 1 is set high. As a result, there is the risk that the occupant will hear high-speed engine sounds and experience discomfort, even though the driving force required by the drive motor 6 is reduced as a result of the occupant's release of the accelerator pedal, or the like. It is thus possible to eliminate the discomfort to the occupant by stopping the engine 1 after time T1.

In addition, if the vehicle speed V is greater than or equal to the vehicle speed threshold value V1 at time T1, because it can be expected that sufficient regenerative power will be obtained by the kinetic energy of the vehicle, it is possible to charge the battery 5 to the required state of charge without maintaining the rotation of the engine 1 and continuing power generation carried out by the generator 4.

If the vehicle speed V is less than the vehicle speed threshold value V2 at time T1, the engine rotational speed Re after time T1 becomes zero or the idling rotational speed, so that the sounds generated by the engine 1 are less noticeable than the road noise, so that discomfort to the occupant is suppressed. In addition, if the vehicle speed V is low, the engine rotational speed Rc of the engine 1 is set low. As a result, the fuel consumption rate of the engine 1 may deteriorate, and therefore the fuel consumption rate is improved by stopping the engine 1 after time T1.

Second Example of Engine Control

Figure 7:
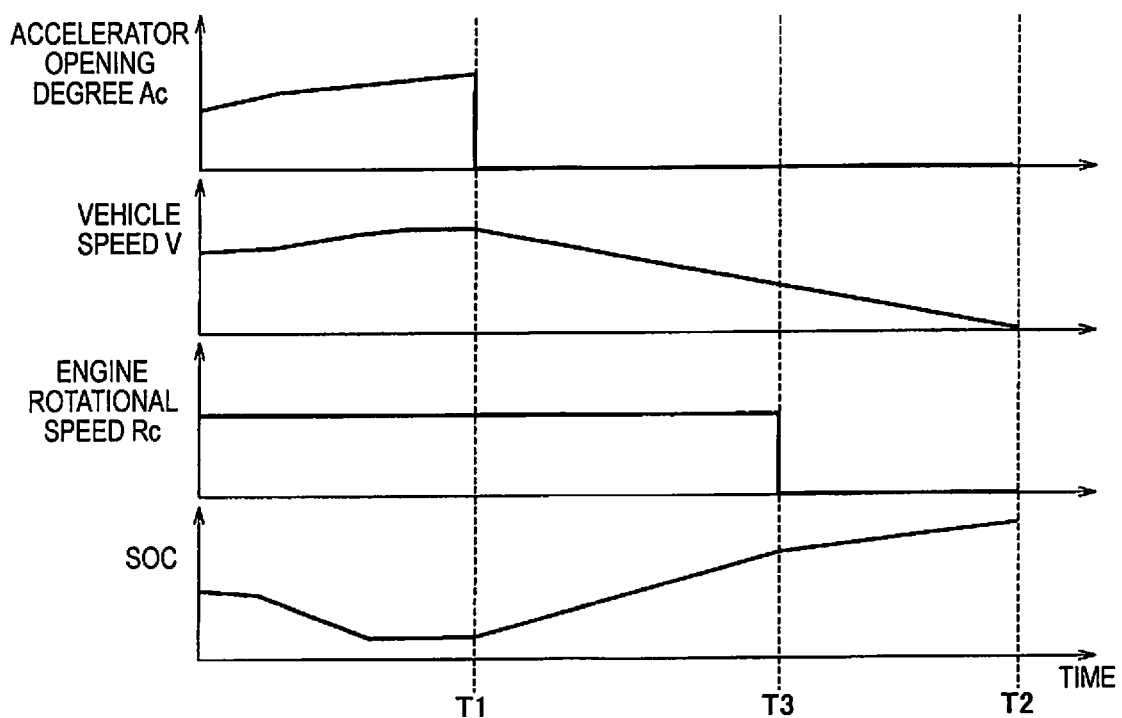
FIG. 7 is a timing chart illustrating a second example of engine control carried out by the electric device according to one embodiment of the present invention.

Next, FIG. 7 is a timing chart illustrating a second example of an engine control carried out by the electric device according to the present embodiment. In the same manner as in FIG. 6, FIG. 7 shows changes in the accelerator opening degree Ac, changes in the vehicle speed V, changes in the engine rotational speed Rc, and changes in the state of charge (SOC) of the battery 5.

The meanings of time T1 and time T2 in FIG. 7 are the same as those for time T1 and time T2 in FIG. 6. In addition, FIG. 7 is also the same as FIG. 6 in the that the engine 1 is started and power generation is started by the generator 4, which receives driving force from the engine 1 at the time period before time T1.

At time T1, when the vehicle speed V is greater than or equal to the vehicle speed threshold value V2 and the vehicle speed V is less than the vehicle speed threshold value V1, and the state of charge of the battery 5 is less than the prescribed charge quantity threshold value, the rotation of the engine 1 is maintained and the power generation carried out by the generator 4 is continued. Therefore, from time T1 to time T3, the battery 5 is charged by the generated electric power from the generator 4 in addition to the regenerative power from the drive motor 6.

When the state of charge of the battery 5 improves and the state of charge of the battery 5 becomes greater than or equal to the prescribed charge quantity threshold value at time T3, the engine 1 is stopped, so that the engine rotational speed Rc becomes zero after time T3. After time T3, the battery 5 is charged by the regenerative power from the drive motor 6.

After time T3, the generated electric power from the generator 4 is not supplied to the battery 5, so that overcharging of the battery 5 is suppressed.

Effects of the Embodiment

As described in detail above, in an electric device control method and an electric device according to the present embodiment, when power generation is executed by a first electric motor by the driving force of an internal combustion engine that is rotatably supported relative to a drive shaft of a vehicle, the rotational speed of the internal combustion engine is set higher as the speed of the vehicle increases, and when the driving force required by a second electric motor that is connected to the drive shaft becomes zero or negative, if the vehicle speed is greater than or equal to a first threshold value, the internal combustion engine is stopped, and if the vehicle speed is less than the first threshold value, the power generation is continued.

As a result, when the occupant releases the accelerator pedal, or the like, and the driving force required by the drive motor 6 becomes zero or decreases, it is possible to prevent the occupant from hearing noise generated by the internal combustion engine, for which a high rotational speed has been set due to the vehicle speed being higher than the first vehicle speed. Therefore, it is possible to eliminate the discomfort to the occupant that occurs as a result of hearing high-frequency or high-speed noise despite the occupant's a deceleration request.

In addition, in the electric device control method and the electric device according to the present embodiment, when power generation is carried out with the first electric motor, the rotational speed of the internal combustion engine may be set to become higher in stepwise fashion as the vehicle speed of the vehicle increases, and the vehicle speed at a boundary at which the rotational speed of the internal combustion engine increases in stepwise fashion may be set as the first threshold value. In particular, operating points having preferable characteristics in terms of performance, such as reduced noise generation by the internal combustion engine, may be used as the operating points of the internal combustion engine according to the rotational speed that is set in stepwise fashion, in order to improve the characteristics of the internal combustion engine and to be able to continue power generation stably, when power is generated by the first electric motor. In addition, it is possible to reduce the noise from the internal combustion engine, thereby eliminating discomfort to the occupant.

Additionally, in the electric device control method and the electric device according to the present embodiment, the first threshold value may be the vehicle speed at which the quantity of electric power, which is assumed to be obtained by regeneration by the second electric motor until the vehicle stops, reaches a prescribed electric energy value. As a result, because it can be expected that sufficient regenerative power will be obtained by the kinetic energy of the vehicle, it is possible to charge the power storage device to the required state of charge without maintaining the rotation of the internal combustion engine and continuing power generation by the first electric motor.

In addition, in the electric device control method and the electric device according to the present embodiment, when the vehicle speed is less than the first threshold value, the internal combustion engine may be stopped if the charge quantity of the power storage device to which the regenerative power from the second electric motor is supplied is greater than or equal to a prescribed charge quantity threshold value. Since excess generated electric power is not supplied from the first electric motor to the power storage device, overcharging of the power storage device is prevented.

Further, in the electric device control method and the electric device according to the present embodiment, when the vehicle speed is lower than the first threshold value, the internal combustion engine may be stopped when the vehicle speed is reduced to less than a second threshold value, which is below the first threshold value, after continuing power generation. If the vehicle speed is less than the second threshold value, road noise tends to be low. If the internal combustion engine is not stopped, there is the risk that noise from the internal combustion engine will become more noticeable than the low-level road noise. However, because the internal combustion engine is stopped when the vehicle speed is below the second threshold value, the noise generated by the internal combustion engine is prevented from creating discomfort for the occupant.

In addition, when the vehicle speed is low, the rotational speed of the internal combustion engine is set low. If the internal combustion engine is not stopped, there is a risk that the fuel consumption rate of the internal combustion engine will deteriorate. However, when the vehicle speed is less than the second threshold value, the internal combustion engine is stopped; therefore, power generation is suppressed in a vehicle speed region with a poor fuel consumption rate, thereby improving the fuel consumption rate.

The contents of the present invention have been explained above in accordance with an embodiment, but the present invention is not limited by these explanations, and it would be obvious to a person skilled in the art that various modifications and improvements are possible. The discussion and drawings that constitute a portion of this disclosure should not be understood as limiting the present invention. Various alternative embodiments, examples, and operational techniques should be apparent to those skilled in the art from this disclosure.

It goes without saying that the present invention can include various other embodiments, and the like, not described herein. Therefore, the technical scope of the present invention is determined only by the matters specifying the invention according to the Claims that are pertinent to the description above.

Each of the functions illustrated in the above-described embodiment can be implemented by one or a plurality of processing circuits. The processing circuits include programmed processing devices, such as processing devices including electrical circuits. The processing devices also include devices such as conventional circuit components and application-specific integrated circuits (ASIC) designed to execute the functions described in the embodiment.

The invention claimed is:

1. An electric device control method for controlling an electric device that includes an internal combustion engine of a vehicle, a generator configured receive a driving force of the internal combustion engine to carry out power generation, and a drive motor connected to a drive shaft that is rotatable relative to the internal combustion engine, the electric device control method comprising:
   setting a rotational speed of the internal combustion engine to increase as a vehicle speed of the vehicle increases while the power generation is carried out by the first electric motor; and
   when the driving force required by the drive motor becomes zero or negative while the generator is carrying out power generation by the driving force of the internal combustion engine, stopping the internal combustion engine when the vehicle speed is greater than or equal to a first threshold value, and continuing the power generation when the vehicle speed is less than the first threshold value.

2. The electric device control method according to claim 1, wherein
   the setting of the rotational speed of the internal combustion engine is set to increase in a stepwise fashion as the vehicle speed of the vehicle increases while the power generation is carried out by the first electric motor, and
   the first threshold value is set to the vehicle speed at which a boundary when the rotational speed of the internal combustion engine increases in the stepwise fashion.

3. The electric device control method according to claim 1, wherein
   the first threshold value is set to the vehicle speed at which a quantity of electric power assumed to be obtained by regeneration by the drive motor until the vehicle stops reaches a prescribed electric energy value.

4. The electric device control method according to claim 1, wherein
   the internal combustion engine is stopped when the vehicle speed is less than the first threshold value, and a quantity of charge in a power storage device to which regenerative power from the drive motor is supplied is greater than or equal to a prescribed charge quantity threshold value.

5. The electric device control method according to claim 1, wherein
   the internal combustion engine is stopped when the vehicle speed is below the first threshold value and the after continuing the power generation the vehicle speed is reduced to fall below a second threshold value, which is smaller than the first threshold value.

6. An electric device comprising:
   an internal combustion engine of a vehicle;
   a generator configured to receive a driving force of the internal combustion engine to carry out power generation;
   a drive motor connected to drive shaft that is rotatable relative to the internal combustion engine; and
   a controller configured to set a rotational speed of the internal combustion engine to increase as a vehicle speed of the vehicle increases while the power generation is carried out by the first electric motor, and when the driving force required by the drive motor becomes zero or negative while the generator is carrying out power generation by the driving force of the internal combustion engine, the controller being configured to stop the internal combustion engine when the vehicle speed is greater than or equal to a first threshold value, and configured to continue the power generation where the vehicle speed is less than the first threshold value.

\* \* \* \* \*